United States Patent
Liese et al.

(10) Patent No.: US 9,771,270 B2
(45) Date of Patent: Sep. 26, 2017

(54) COLD FILAMENT IGNITION SYSTEM AND METHOD OF SILICON RODS

(71) Applicant: GTAT Corporation, Merrimack, NH (US)

(72) Inventors: Michael Harro Liese, Duesseldorf (DE); Wilfried Vollmar, Soest (DE); Casey Michael Wornath, Lolo, MT (US)

(73) Assignee: GTAT Corporation, Merrimack, NH (US)

( * ) Notice: Subject to any disclaimer, the term of this patent is extended or adjusted under 35 U.S.C. 154(b) by 463 days.

(21) Appl. No.: 14/452,724

(22) Filed: Aug. 6, 2014

(65) Prior Publication Data

US 2015/0044119 A1 Feb. 12, 2015

Related U.S. Application Data

(60) Provisional application No. 61/862,710, filed on Aug. 6, 2013.

(51) Int. Cl.

| | |
|---|---|
| *C01B 33/021* | (2006.01) |
| *B01J 19/08* | (2006.01) |
| *C01B 33/035* | (2006.01) |
| *H05B 1/02* | (2006.01) |

(52) U.S. Cl.
CPC ............ *C01B 33/021* (2013.01); *B01J 19/087* (2013.01); *C01B 33/035* (2013.01); *H05B 1/0233* (2013.01); *B01J 2219/0803* (2013.01); *B01J 2219/0879* (2013.01)

(58) Field of Classification Search
CPC .... C01B 33/021; C01B 33/035; B01J 19/087; B01J 2219/0803; B01J 2219/0879; H05B 1/0233; H05B 3/0047

USPC .............. 219/483–487, 497, 494, 503; 392/416–418

See application file for complete search history.

(56) References Cited

U.S. PATENT DOCUMENTS

| | | | | |
|---|---|---|---|---|
| 4,093,847 | A | * 6/1978 | Walker | .................... F24H 1/106 219/501 |
| 2008/0179952 | A1 | 7/2008 | Vollmar et al. | |
| 2013/0273265 | A1* | 10/2013 | Vollmar | ................ C01B 33/035 427/588 |

FOREIGN PATENT DOCUMENTS

| | | |
|---|---|---|
| DE | 102011117462 A1 | 5/2013 |
| DE | 102011117552 A1 | 5/2013 |
| EP | 2551862 A1 | 1/2013 |

OTHER PUBLICATIONS

PCT Search Report dated Nov. 17, 2014 of Patent Application No. PCT/US2014/049858 filed Aug. 6, 2014, 10 pages.

* cited by examiner

*Primary Examiner* — Mark Paschall
(74) *Attorney, Agent, or Firm* — Parker Ibrahim & Berg LLC; Stephen D. LeBarron

(57) ABSTRACT

A method and system of igniting one or more filaments for silicon production includes applying an output voltage to the one or more filaments using a transformer connected with the one or more filaments. In addition, the method includes supplying, in combination with the application of the output voltage, a current to a primary winding of the transformer via a choke to limit the current to a first predetermined current threshold range. The combination of the supplied current and applied output voltage allows a predetermined output range to be generated from a power supply device initially required to ignite the one or more filaments.

26 Claims, 6 Drawing Sheets

COLD FILAMENT IGNITION SYSTEM AND METHOD OF SILICON RODS

RELATED APPLICATIONS

This application claims the benefit of U.S. Provisional Application No. 61/862,710, filed Aug. 6, 2013. This application is herein incorporated by reference in its entirety for all purposes.

FIELD OF THE INVENTION

The present invention relates to ignition of silicon filaments and, in particular, to the production of silicon after igniting the silicon filaments.

BACKGROUND OF THE INVENTION

In semiconductor fabrication processes and photovoltaic applications utilizing processes such as chemical vapor deposition (CVD), materials are typically heated in reaction chambers that require high synchronous voltages to achieve reaction and/or deposition of various chemical agents. In particular, a typical CVD reaction process utilizes electrical energy to heat silicon seed rods (e.g., filaments) to a temperature at which silicon deposition. Electrical energy heats the silicon seed rods using resistive heating as a current is passed through the silicon seed rods. Due to the inverse relationship between the resistivity of silicon and temperature, an external heat source, a high voltage, or a combination thereof may be used to initiate the flow of the current through the silicon seed rods. However, as the silicon seed rods heat up, the resistance of the silicon seed rods rapidly changes and the current flow also rapidly changes which may have significant impact on the likelihood of achieving the deposition process as melting can occur when the current and ultimately seed rod temperature increases beyond a predetermined threshold. The current must be limited before a certain threshold is met. Therefore, it is desirable to provide improved systems and methods for self-limiting the current that passes through the silicon seed rods to prevent the silicon seed rods from melting when the heat increases and the resistance drops beyond a predetermined level.

SUMMARY OF THE INVENTION

In an exemplary embodiment of the present invention for igniting one or more filaments for silicon production, an output voltage may be applied to the one or more filaments using a transformer connected in series with the one or more filaments. In addition, a current may be supplied to a primary winding of the transformer in combination with the application of the output voltage via a choke to limit the current to a first predetermined current threshold range. The combination of the supplied current and the applied output voltage allows a predetermined output range to be generated from a power supply device initially required to ignite the one or more filaments.

Specifically, the output voltage may be applied to each of the one or more filaments preferably having a hairpin shape and may be applied to each of the one or more filaments via an input voltage to the primary winding based on a turns ratio. This input voltage may range from about 200 V to 700 V and the output voltage may range from about 6,000 V to 10,000 V. In addition, the first predetermined current threshold range may be a current that ranges from about 4 A to 8 A, preferably 6 A. Further, the transformer that applies the output voltage to the one or more filaments may be a single phase transformer and the choke may be an inductor.

In another exemplary embodiment of the present invention for igniting one or more filaments for silicon production, a polarity of either a first or second transformer may be reversed when a first filament and a second filament have reached the first predetermined current threshold range. While the output voltage is still being applied to the first or the second filament, the output voltage may be applied to a third filament using a third transformer connected in parallel with the first and the second transformers. The choke may be bypassed until a second predetermined current threshold range is reached to ignite the filaments and when that second predetermined current threshold is reached, the current may be limited to that second predetermined current threshold range via anyone of the first, second, or third transformers. The polarity above of either the first or the second transformer may be reversed when the first and the second filaments have reach the second predetermined current threshold range which ranges from about 25 A to 50 A, but preferably ranges from 25 A to 30 A, and more preferably 25 A. Then, the output voltage may be applied to a fourth, fifth, and sixth filament using a plurality of switches to allow all six filaments to be ignited using the three transformers. In addition, the voltage across the circuit may be about 0 V and each end of the circuit may be grounded.

In yet another exemplary embodiment, the method of igniting one or more filaments as described above may be used to produce silicon by placing the one or more filaments in a production device. After the one or more filaments are placed in the production device, the above method is performed to ignite all six filaments using three transformers in preparation to produce silicon.

One general aspect of the present invention is a method of igniting one or more filaments for silicon production. The method includes applying an output voltage to the one or more filaments using a transformer connected with the one or more filaments, and supplying, in combination with the application of the output voltage, a current to a primary winding of the transformer via a choke to limit the current to a first predetermined current threshold range, wherein the combination of the supplied current and applied output voltage allows a predetermined output range to be generated from a power supply device initially required to ignite the one or more filaments.

Embodiments further include applying the output voltage to each of the one or more filaments. In some of these embodiments, the output voltage is applied to each of the one or more filaments via an input voltage to the primary winding based on a turns ratio. In other of these embodiments, the input voltage ranges from about 200 V to 700 V and the output voltage ranges from about 6,000 V to 10,000 V.

In various embodiments, the first predetermined current threshold range is about 4 A to 8 A. In certain embodiments, the transformer is a single phase transformer and the choke is an inductor. In other embodiments, each of the one or more filaments has a hairpin shape.

Embodiments further include reversing a polarity of either a first transformer or a second transformer when a first filament and a second filament have reached the first predetermined current threshold, applying the output voltage to a third filament using a third transformer connected in parallel with the first transformer and the second transformer, while still applying the output voltage to the first filament or the second filament, bypassing the choke of each transformer until a second predetermined current threshold range is reached to ignite the filaments, and in response to reaching the second predetermined current threshold range, limiting the current to that second predetermined current threshold range via anyone of the first transformer, second transformer, or third transformer.

Some of these embodiments further include reversing the polarity of either the first transformer or the second transformer when the first filament and the second filament have reached the second predetermined current threshold range. In other of these embodiments, the second predetermined current threshold range is about 25 A to 50 A. And in some of these embodiments the second predetermined current threshold is about 25 A to 30 A.

Various of these embodiments further include applying the output voltage to a fourth filament, a fifth filament, and a sixth filament using a plurality of switches in parallel to the filaments to allow all six filaments to be ignited using the first transformer, the second transformer, and the third transformer.

In certain of these embodiments, the voltage across a circuit is about 0 V and each end of the circuit is grounded. And in some of these embodiments, the transformer is connected in series with the one or more filaments.

A second general aspect of the present invention is a system that ignites one or more filaments for silicon production. The system includes a transformer connected with the one or more filaments and configured to apply an output voltage to the one or more filaments, and a choke configured to operate, in combination with the application of the output voltage, to supply a current to a primary winding of the transformer to limit the current to a first predetermined current threshold range, wherein the combination of the supplied current and applied output voltage allows a predetermined output range to be generated from a power supply device initially required to ignite the one or more filaments.

In embodiments, the transformer is further configured to apply the output voltage to each of the one or more filaments. And in some of these embodiments the output voltage is applied to each of the one or more filaments via an input voltage to the primary winding based on a turns ratio.

In various embodiments, the input voltage ranges from about 200 V to 700 V and the output voltage ranges from about 6,000 V to 10,000 V. In some embodiments, the first predetermined current threshold range is about 4 A to 8 A. In other embodiments, the transformer is a single phase transformer and the choke is an inductor.

In certain embodiments, each of the one or more filaments has a hairpin shape. Various embodiments further include a switch configured to reverse a polarity of either a first transformer or a second transformer when a first filament and a second filament have reached the first predetermined current threshold range, and a third transformer connected in parallel with the first transformer and the second transformer and configured to apply the output voltage to a third filament, wherein the choke is configured to limit the current to a second predetermined current threshold range to ignite the filaments, and wherein anyone of first transformer, the second transformer, or the third transformer is configured to limit the current to that second predetermined current threshold range when the second predetermined current threshold range is reached.

In certain of these embodiments, the switch is further configured to reverse the polarity of either the first transformer or the second transformer when the first filament and the second filament have reached the second predetermined current threshold range.

In some of these embodiments, the second predetermined current threshold range is about 25 A to 50 A. In other of these embodiments, the second predetermined current threshold range is about 25 A to 30 A. In still other of these embodiments, the first transformer, the second transformer, and the third transformer are further configured to apply the output voltage to a fourth filament, a fifth filament, and a sixth filament using a plurality of switches to ignite all six filaments. And in yet other of these embodiments the voltage across a circuit is about 0 V and each end of the circuit is grounded.

A third general aspect of the present invention is a method for producing silicon. The method includes placing one or more filaments in a production device, applying an output voltage to the one or more filaments using a transformer connected with the one or more filaments, supplying, in combination with the application of the output voltage, a current to a primary winding of the transformer via a choke to limit the current to a first predetermined current threshold range, wherein the combination of the supplied current and applied output voltage allows a predetermined output range to be generated from a power supply device initially required to ignite the one or more filaments, and producing silicon.

Embodiments further include applying the output voltage to each of the one or more filaments. In some of these embodiments, the output voltage is applied to each of the one or more filaments via an input voltage to the primary winding based on a turns ratio. In other of these embodiments, the input voltage ranges from about 200 V to 700 V and the output voltage ranges from about 6,000 V to 10,000 V.

In embodiments, the first predetermined current threshold range is about 4 A to 8 A. In various embodiments, the transformer is a single phase transformer and the choke is an inductor. In certain embodiments, each of the one or more filaments has a hairpin shape. Some embodiments further include reversing a polarity of either a first transformer or a second transformer when a first filament and a second filament have reached the first predetermined current threshold range, applying the output voltage to a third filament using a third transformer connected in parallel with the first transformer and the second transformer, while still applying the output voltage to the first filament or the second filament, bypassing the choke until a second predetermined current threshold range is reached to ignite the filaments, and in response to reaching the second predetermined current threshold range, limiting the current to that second predetermined current threshold range via anyone of the first transformer, second transformer, or third transformer.

Some of these embodiments further include reversing the polarity of either the first transformer or the second transformer when the first filament and the second filament have reached the second predetermined current threshold range. In other of these embodiments the second predetermined current threshold range is about 25 A to 50 A. And in some of these embodiments, the second predetermined current threshold range is about 25 A to 30 A.

Various of these embodiments further include applying a voltage to a fourth filament, a fifth filament, and a sixth filament using a plurality of switches to ignite all six filaments using the first transformer, the second transformer, and the third transformer. And in some of these embodiments the voltage across a circuit is about 0 V and each end of the circuit is grounded.

And in embodiments, the transformer is connected in series with the filaments.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1:
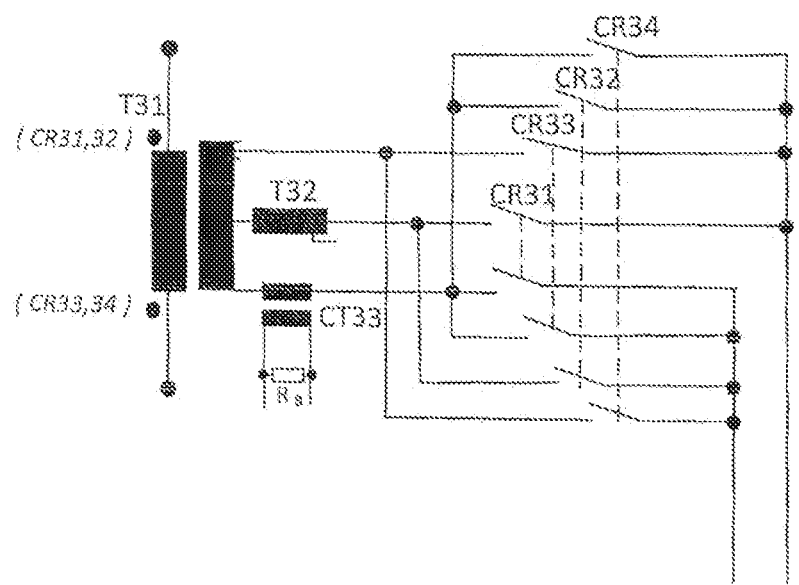
FIG. 1 illustrates an exemplary schematic of a transformer according to an exemplary embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the following detailed description, reference is made to the accompanying drawings, which for a part hereof. In the drawings, similar symbols typically identify similar components, unless context dictates otherwise. The illustrative embodiments described in the detailed description, drawings, and claims are not meant to be limiting. Other embodiments maybe utilized, and other changes may be made, without departing from the spirit or scope of the subject matter presented herein. It will be readily understood that the aspects of the present invention, as generally described herein, and illustrated in the Figures, can be arranged, substituted, combined, separated, and designed in a wide variety of different configurations, all of which are explicitly contemplated herein. Further, in the following description, numerous details are set forth to further describe and explain one or more embodiments. These details include system configurations, block module diagrams, circuit diagrams, flowcharts, and accompanying written description. While these details are helpful to explain one or more embodiments of the invention, those skilled in the art will understand that these specific details are not required in order to practice the embodiments.

An exemplary embodiment herein provides a method and a system of igniting one or more filaments to produce silicon. Specifically, a transformer and a choke (e.g., an inductor) may be used in combination to ignite the one or more filaments by applying an output voltage to the filaments using the transformer and supplying a current to a primary winding of the transformer via a choke to limit the current to a predetermined current threshold. The current is limited to prevent the current from increasing to a point of causing the filaments to melt from overheating, also known in the art as a "thermal runaway" phenomenon. In a particular example, the present invention combines three transformers and three chokes to ignite six filaments, as compared to the related art. These three transformer and choke combinations are required to ignite six filaments, however the exemplary embodiment may be applied to any number of transformers. In addition, the primary winding of the transformer is typically, one of two windings and connected to the power supply device while a second winding is typically connected to the load.

Moreover, an exemplary embodiment of the present invention provides a system, specifically, a silicon production system (e.g., furnace, reactor, electronic device, etc.) that ignites one or more filaments for silicon production. Each of the filaments may have a hairpin shape or may have a vertical shape such that the filament may be either bent or straight. Alternatively, a filament hairpin may consist of two vertical silicon seed rod segments connected by a horizontal bridge (e.g., a U-shaped hairpin). The cross-sectional shape of each seed rod may be circular, rectangular, or the like. In addition, the seed rod may be a solid silicon seed rod or tubular. However, the present invention is not limited thereto and each filament may have various shapes.

Figure 3:
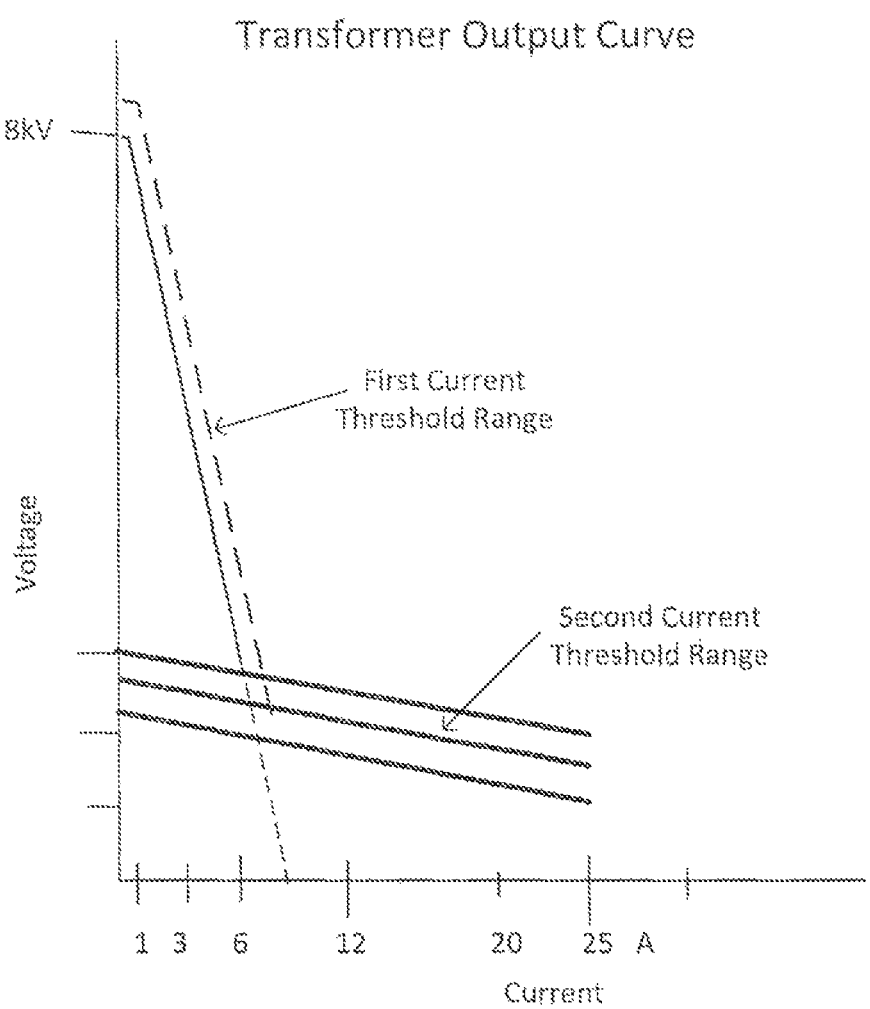
FIG. 3 illustrates an output curve generated from a power supply device according to an exemplary embodiment of the present invention.

As shown in FIG. 1, the system of an exemplary embodiment of the present invention may include a transformer T31 (e.g., a single phase transformer) that is connected with the one or more filaments and is configured to apply an output voltage to the one or more filaments. Specifically, the transformer T31 may be connected in series with the filaments. The output voltage applied to the filaments may range from about 6,000 V to 10,000 V, and preferably 8,000 V, to initiate an initial current flow to the system. Also included in the system is a choke (e.g., an inductor) T32 that is configured to operate in combination with the application of the output voltage. The current supplied to a primary winding of a transformer limits the current to a first predetermined current threshold range. Specifically, the current may be supplied to the filaments from a secondary side of the transformer T31 via the choke T32 or directly to the transformer T31 using a plurality of switches (as shown in FIG. 1) CR31, CR32, CR33, and CR34. As shown in the exemplary graph of FIG. 3, the combination of the supplied current and the applied output voltage allows a predetermined output range to be generated from a power supply device initially required to ignite the one or more filaments. The exemplary graph of FIG. 3, showing an exemplary transformer curve of the first current threshold range and the second current threshold range, illustrates the advantage of combining a transformer and a choke to limit the current to prevent filament melting.

Figure 2:
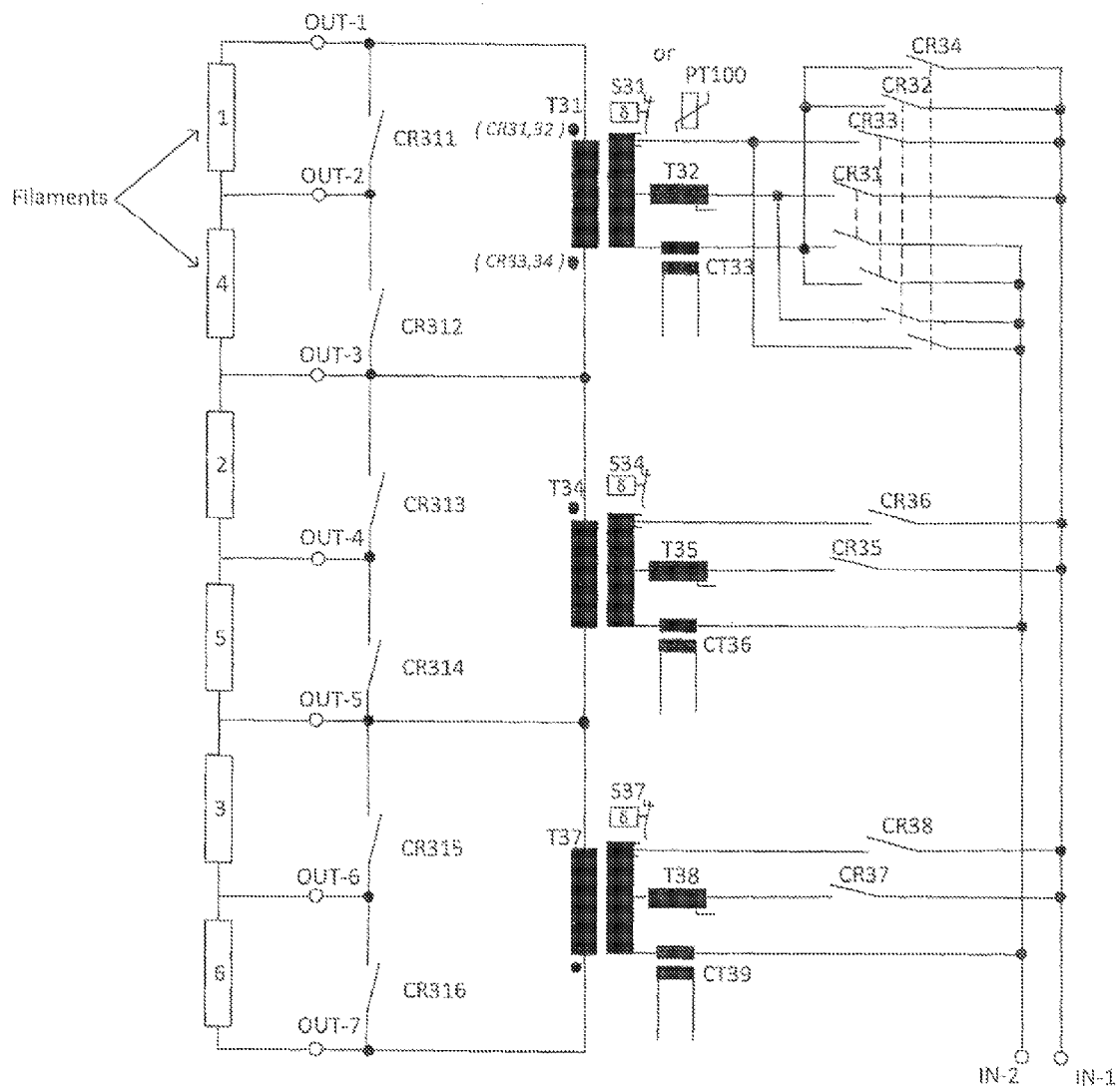
FIG. 2 illustrates a cold filament ignition system having a load connected across each of the output terminals according to an exemplary embodiment of the present invention.

During operation of the exemplary embodiment of the present invention, when the current begins to now within the system, the filaments begin to heat up thus, causing the resistance to decrease. As the resistance decreases, the current flowing within the system rapidly increases and the temperature further increases, causing the filaments to melt when a melting point temperature is reached. Therefore, the system in the exemplary embodiment of the present invention is configured to limit the current flowing within the system to a predetermined current threshold range to prevent the temperature from reaching the melting point of the silicon filament, thus preventing the filaments from melting. Specifically, a first predetermined current threshold range to which the current may be limited may be from about 4 A to 8 A, preferably about 5 A to 7 A and more preferably about 6 A. The preferred predetermined current threshold may be about 6 A. In addition, as shown in FIG. 2, a plurality of temperatures switches (S31, S24, and S37) may be used to detect an over temperature of the transformers ('1'31, '1'34, and T37) to thus prevent the temperature from reaching a predetermined temperature threshold. However, the present invention is not limited to the above measurements and other methods of measuring the temperature of the transformers may be used as well, as illustrated by PT100 in FIG. 2.

The transformer may further be configured to apply the output voltage to each of the one or more filaments. In particular, the output voltage may be applied to each of the filaments via an input voltage to a primary winding of the transformer based on a turns ratio. The input voltage may range from about 200 V to 700 V, and preferably 400 V to 500 V and the voltage across the circuit may be about 0 V, wherein each end of the circuit may be grounded. The turns ratio is a ratio of the number of windings of each side of the transformer. In other words, the lower voltage (i.e., the input voltage) may be applied to ignite the filaments after the higher voltage (i.e., the output voltage) used to initiate the current now has been applied to the filaments.

In another exemplary embodiment of the present invention, the system may be configured to ignite a first filament and a second filament using a first transformer and a second transformer by applying an output voltage ranging from about 6,000 V to 10,000 V to the filaments. As shown in FIG. 2, when the first and the second filaments (e.g., two of filaments 16 shown in FIG. 2) have reached a first predetermined current threshold range (e.g., about 4 A to 8 A), a switch (CR31-CR38) may open and close by a control unit (e.g. a controller, not shown) that actuates the transformers (T31, T34, and T37) to selectively reverse a polarity of either the first or the second transformer and to turn off one of the first or the second transformers (e.g., T31 or T34). It is understood that the term controller refers to a hardware device that includes a memory and a processor. The memory is configured to store the modules and the processor is specifically configured to execute said modules to perform one or more processes. Then, a third transformer (e.g., T37) that is connected in parallel with the first and the second transformers may apply the output voltage to a third filament or a combination of filaments.

Similar to the previous exemplary embodiments, the choke (T32, T35, or T38) may be used to limit the current to a first predetermined current threshold range to ignite the filaments. The choke may then be bypassed and the current may be limited to only the second predetermined current threshold range. The second predetermined current threshold range may be from about 25 A to 50 A but may preferably range from about 25 A to 30 A. The first and second predetermined current threshold ranges may be calculated using current transformers (CT33, CT36, and CT39), as shown in FIGS. 1 and 2, specifically used to measure the current on the primary side of each transformer.

Additionally, when the first and the second filaments have reached the second predetermined current threshold range, the switch may be used (e.g., one switch may be opened and another switch may be closed) to reverse the polarity of either the first or the second transformer. Therefore, the first, second, and the third transformers may be further configured to apply the output voltage to a fourth, fifth, and sixth filament using the plurality of switches (CR311-CR316) within the system to ignite all six filaments (1-6 in FIG. 2) in this exemplary embodiment.

Notably, the order of the transformers and the filaments is merely for illustrative purposes to show the use of three transformers in combination with three chokes to ignite the six filaments and does not recite a specific order of igniting the filaments or switching transformers on and off. The three transformers (T31, T34, and T37) and the three chokes (T32, T35, and T38) may be interchanged as desired and similarly, the six filaments may be ignited in any order.

Figure 4:
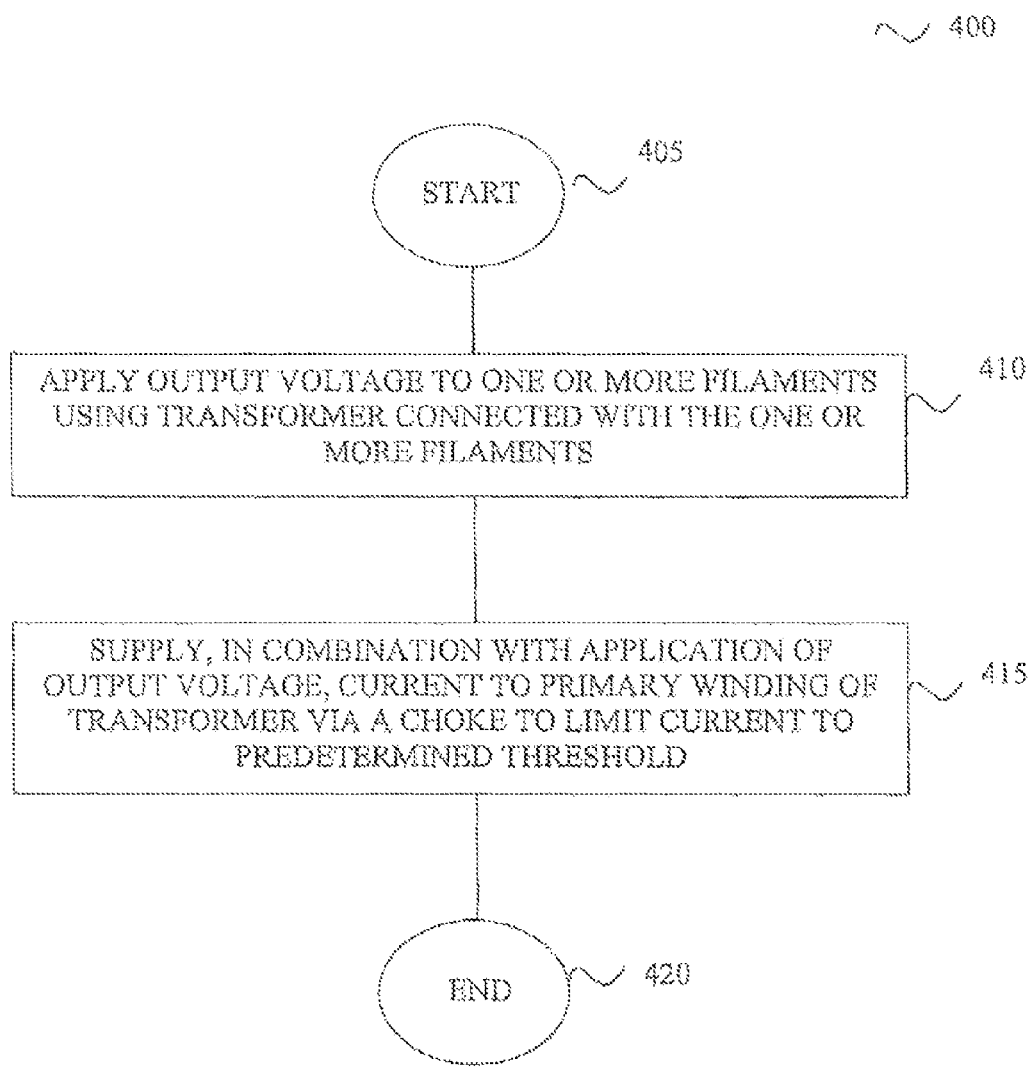
FIGS. 4-5 illustrate exemplary simplified procedures of igniting filaments according to an exemplary embodiment of the present invention.

FIG. 4 illustrates an exemplary simplified procedure 400 for igniting one or more filaments for silicon production according to an exemplary embodiment of the present invention described herein. The procedure 400 may start at step 405, and continues 410, where an output voltage may be applied to the one or more filaments using a transformer connected with the one or more filaments. In step 415, in combination with the application of the output voltage, a current may be supply to a primary winding of the transformer via a choke to limit the current to a first predetermined current threshold range. The combination of the supplied current and output voltage allows a predetermined output range to be generated from a power supply device initially required to ignite the one or more filaments. Then the process may illustratively end in step 420.

Figure 5:
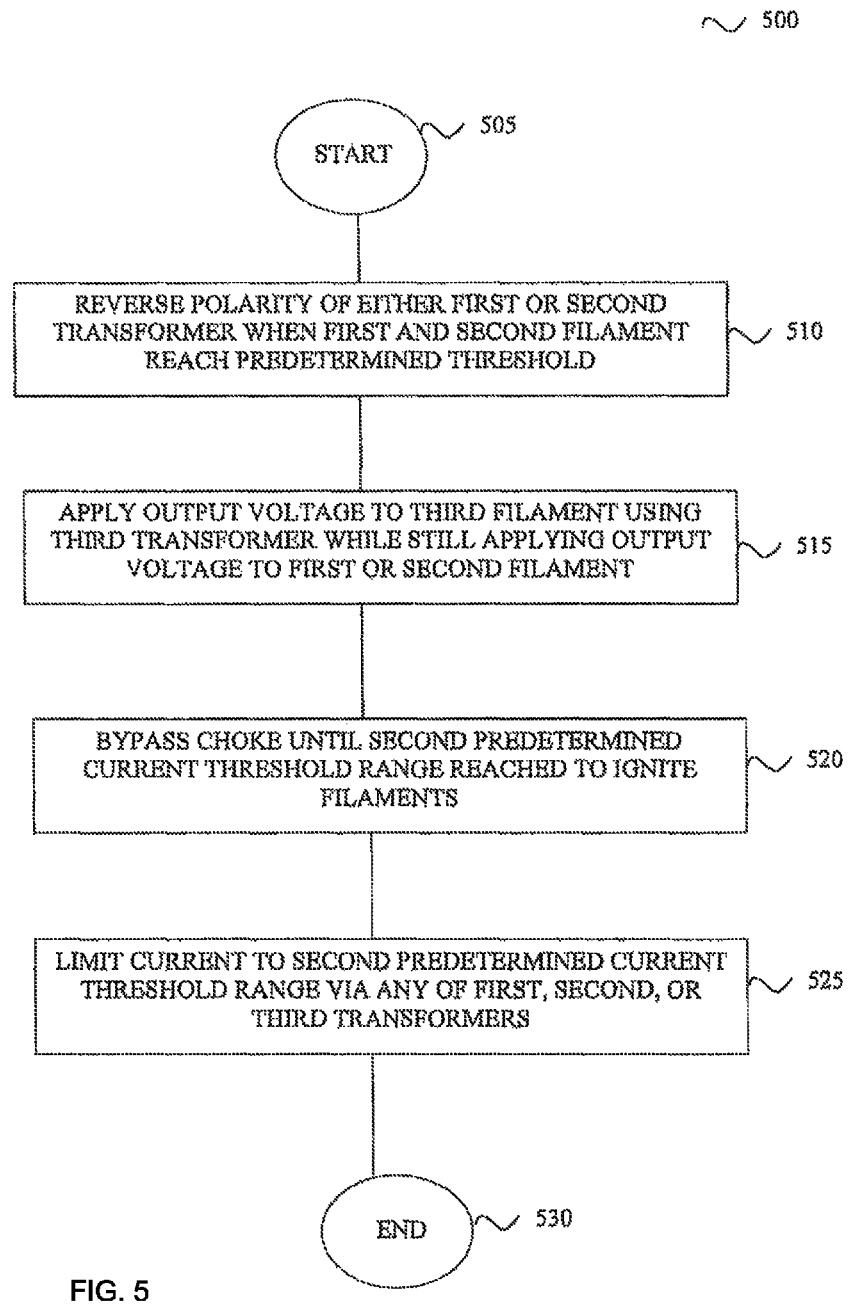

In another embodiment, as shown in FIG. 5, a simplified procedure 500 for igniting one or more filaments for silicon production according to an exemplary embodiment of the present invention described herein includes a procedure starting at step 505 and is a continuation from step 415 of FIG. 4. Specifically, in step 510, the polarity of either a first transformer or a second transformer may be selectively reversed when a first filament and a second filament have reached the first predetermined current threshold range. In step 515, the output voltage, as described in step 410 of FIG. 4, may be applied to a third filament (or a combination of filaments) using a third transformer connected in parallel with the first transformer and the second transformer, while still applying the output voltage to the first filament or the second filament. Furthermore, in step 520, the choke may be bypassed (e.g., current may be supplied directly to the primary side of the transformer) until a second predetermined current threshold range is reached to ignite the filaments. In response to reaching the second predetermined current threshold range, in step 520, the current may be limited to that second predetermined current threshold range via anyone of the first transformer, second transformer, or third transformer and then the process may illustratively end in step 525.

Figure 6:
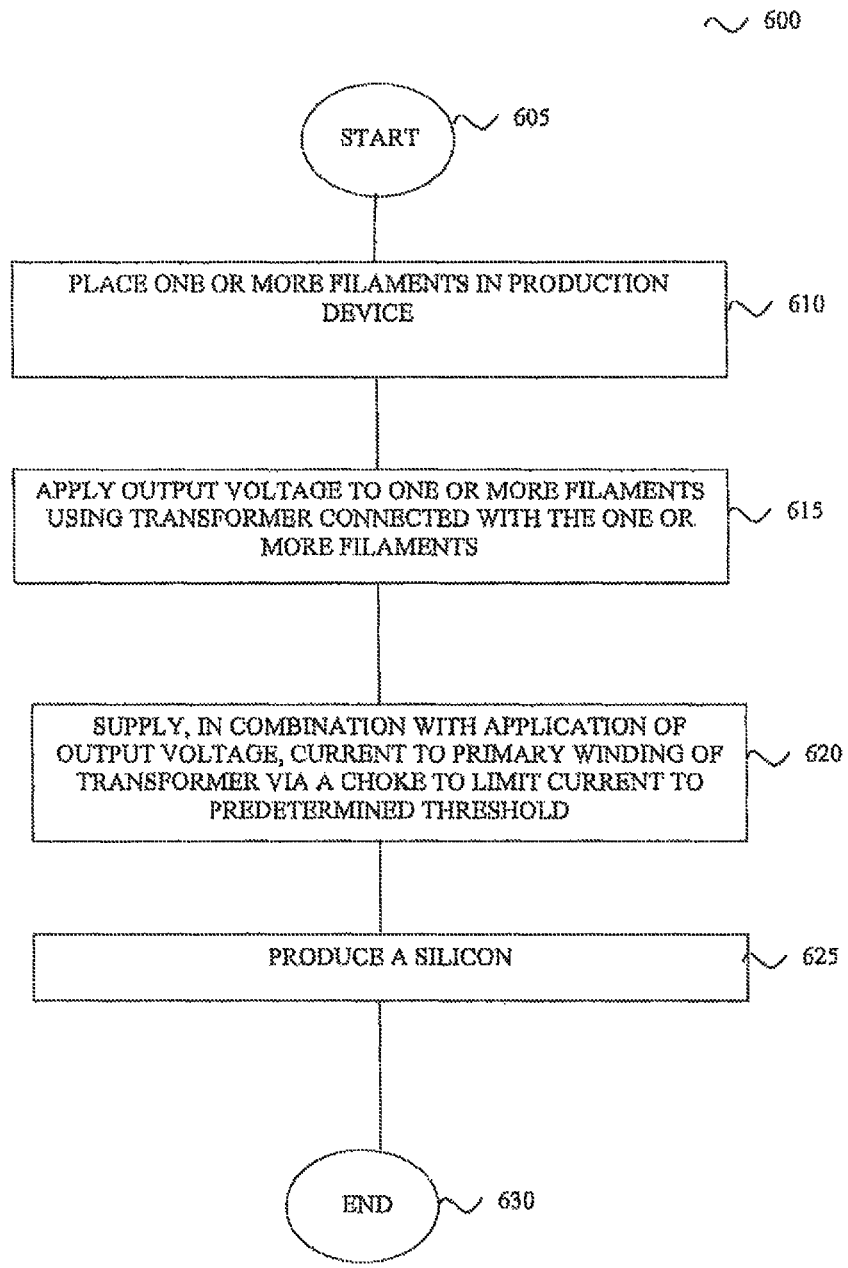
FIG. 6 illustrates an exemplary simplified procedure of producing silicon by igniting filaments according to an exemplary embodiment of the present invention.

In yet another embodiment, as shown in FIG. 6, a simplified procedure 600 for producing silicon according to an exemplary embodiment of the present invention described herein includes a procedure starting at step 605 and continuing to step 610, when one or more filaments may be placed in a production device. In step 615, an output voltage may be applied to the one or more filaments using a transformer connected with the one or more filaments. Then in step 620, a current may be supplied in combination with the application of the output voltage to a primary winding of the transformer via a choke to limit the current to a first predetermined current threshold range. In step 625, silicon may be produced and then the process may illustratively end in step 630.

Note that the circuit diagrams, processes, graphs, devices, and systems described in the present invention may be integrated or divided into different combinations of the systems as would be known to those skilled in the art. In addition, the order of the components of the system may be interchangeable and are not limited to the specific order as described in the exemplary embodiments above.

The current is limited to prevent the current from increasing to a point of causing the filaments to melt from overheating, also known in the art as a "thermal runaway" phenomenon. Further, the current may be limited according to the exemplary curves in the graph of FIG. 3 by specially designed transformers and chokes, thus eliminating the need for an additional semiconductor device and associated electronic controls. Furthermore, additional circuit protections may be omitted, thus simplifying the construction of the configuration. In a particular example, the present invention combines three transformers and three chokes to ignite six filaments, as compared to the related art. These three transformer and choke combinations are required to ignite six filaments, however the exemplary embodiment may be applied to any number of transformers. The exemplary curves shown in FIG. 3 may also be optimized by adjusting the transformer and choke parameters to apply the configuration to various CVD reaction chambers.

The techniques described herein, therefore, prevent a thermal runaway phenomenon which causes filaments to melt due to overheating as the current increases, without requiring additional external equipment to limit the current. In addition, the techniques herein provide a system that is capable igniting a plurality of filaments using less magnetics and electronics than the systems known in the related art. Thus, a more efficient system is provided herein to ignite multiple filaments.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention.

The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. A method of igniting one or more filaments for silicon production, comprising:
    applying an output voltage to the one or more filaments using a transformer connected with the one or more filaments;
    supplying, in combination with the application of the output voltage, a current to a primary winding of the transformer via a choke to limit the current to a first predetermined current threshold range,
    wherein the combination of the supplied current and applied output voltage allows a predetermined output range to be generated from a power supply device initially required to ignite the one or more filaments;
    reversing a polarity of either a first transformer or a second transformer when a first filament and a second filament have reached the first predetermined current threshold;
    applying the output voltage to a third filament using a third transformer connected in parallel with the first transformer and the second transformer, while still applying the output voltage to the first filament or the second filament;
    bypassing the choke of each transformer until a second predetermined current threshold range is reached to ignite the filaments; and
    in response to reaching the second predetermined current threshold range, limiting the current to that second predetermined current threshold range via anyone of the first transformer, second transformer, or third transformer.

2. The method of claim 1, further comprising:
    applying the output voltage to each of the one or more filaments.

3. The method of claim 2, wherein the output voltage is applied to each of the one or more filaments via an input voltage to the primary winding based on a turns ratio.

4. The method of claim 2, wherein the input voltage ranges from about 200 V to 700 V and the output voltage ranges from about 6,000 V to 10,000 V.

5. The method of claim 1, wherein the first predetermined current threshold range is about 4 A to 8 A.

6. The method of claim 1, wherein the transformer is a single phase transformer and the choke is an inductor.

7. The method of claim 1, wherein each of the one or more filaments has a hairpin shape.

8. The method of claim 1, further comprising:
    reversing the polarity of either the first transformer or the second transformer when the first filament and the second filament have reached the second predetermined current threshold range.

9. The method of claim 1, wherein the second predetermined current threshold range is about 25 A to 50 A.

10. The method of claim 9, wherein the second predetermined current threshold is about 25 A to 30 A.

11. The method of claim 1, further comprising:
    applying the output voltage to a fourth filament, a fifth filament, and a sixth filament using a plurality of switches in parallel to the filaments to allow all six filaments to be ignited using the first transformer, the second transformer, and the third transformer.

12. The method of claim 1, wherein the voltage across a circuit is about 0 V and each end of the circuit is grounded.

13. The method of claim 1, wherein the transformer is connected in series with the one or more filaments.

14. A method for producing silicon, comprising:
placing one or more filaments in a production device;
applying an output voltage to the one or more filaments using a transformer connected with the one or more filaments;
supplying, in combination with the application of the output voltage, a current to a primary winding of the transformer via a choke to limit the current to a first predetermined current threshold range,
wherein the combination of the supplied current and applied output voltage allows a predetermined output range to be generated from a power supply device initially required to ignite the one or more filaments;
reversing a polarity of either a first transformer or a second transformer when a first filament and a second filament have reached the first predetermined current threshold range;
applying the output voltage to a third filament using a third transformer connected in parallel with the first transformer and the second transformer, while still applying the output voltage to the first filament or the second filament;
bypassing the choke until a second predetermined current threshold range is reached to ignite the filaments;
in response to reaching the second predetermined current threshold range, limiting the current to that second predetermined current threshold range via anyone of the first transformer, second transformer, or third transformer; and
producing silicon.

15. The method of claim 14, further comprising:
applying the output voltage to each of the one or more filaments.

16. The method of claim 15, wherein the output voltage is applied to each of the one or more filaments via an input voltage to the primary winding based on a turns ratio.

17. The method of claim 15, wherein the input voltage ranges from about 200 V to 700 V and the output voltage ranges from about 6,000 V to 10,000 V.

18. The method of claim 14, wherein the first predetermined current threshold range is about 4 A to 8 A.

19. The method of claim 14, wherein the transformer is a single phase transformer and the choke is an inductor.

20. The method of claim 14, wherein each of the one or more filaments has a hairpin shape.

21. The method of claim 14, further comprising:
reversing the polarity of either the first transformer or the second transformer when the first filament and the second filament have reached the second predetermined current threshold range.

22. The method of claim 14, wherein the second predetermined current threshold range is about 25 A to 50 A.

23. The method of claim 22, wherein the second predetermined current threshold range is about 25 A to 30 A.

24. The method of claim 14, further comprising:
applying a voltage to a fourth filament, a fifth filament, and a sixth filament using a plurality of switches to ignite all six filaments using the first transformer, the second transformer, and the third transformer.

25. The method of claim 14, wherein the voltage across a circuit is about 0 V and each end of the circuit is grounded.

26. The method of claim 14, wherein the transformer is connected in series with the filaments.

* * * * *